UNITED STATES PATENT OFFICE.

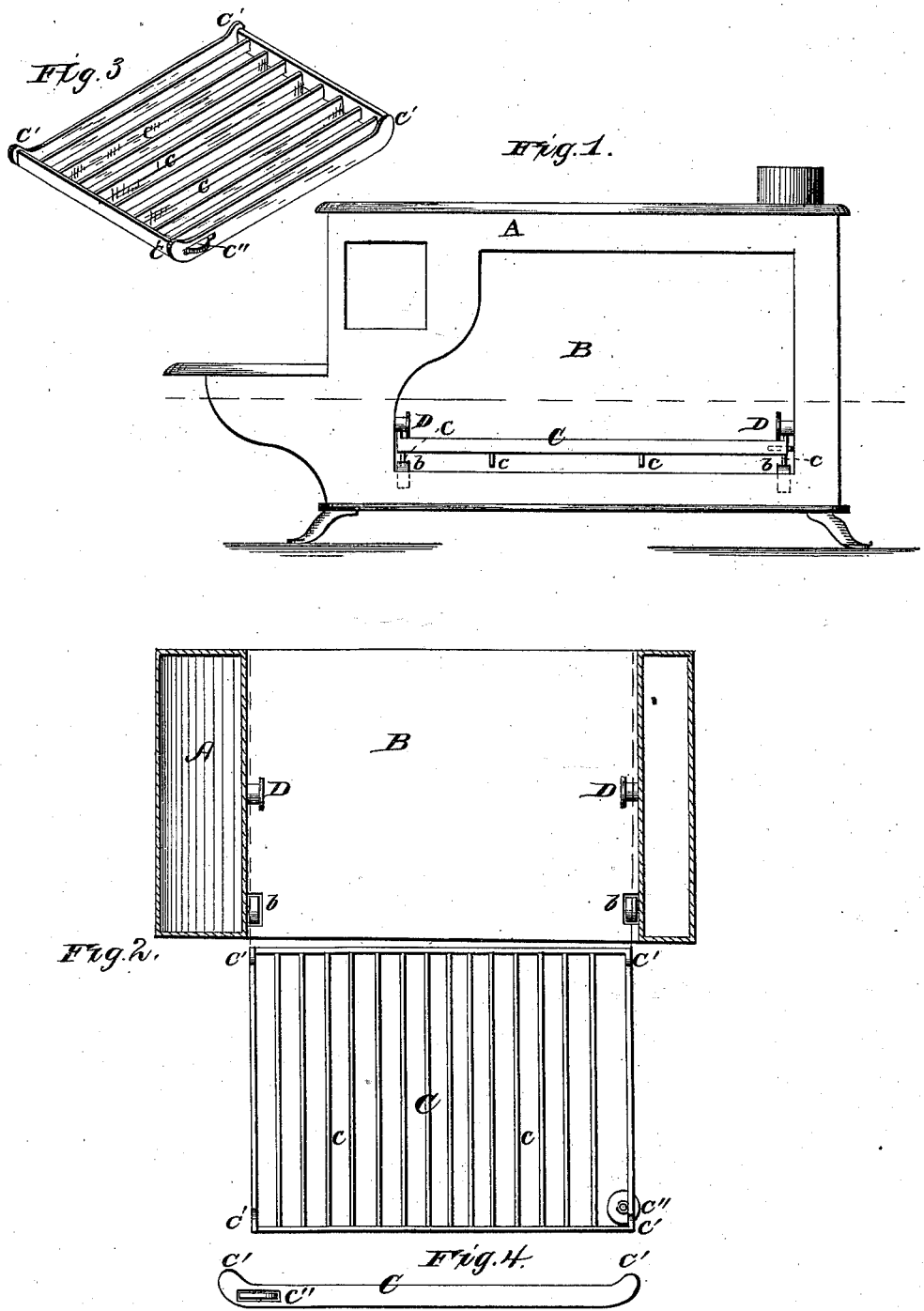

ALPHEUS M. BLAKESLEY, OF ROCK ISLAND, ILLINOIS.

IMPROVEMENT IN DOMESTIC OVENS.

Specification forming part of Letters Patent No. 201,736, dated March 26, 1878; application filed February 26, 1878.

*To all whom it may concern:*

Be it known that I, ALPHEUS M. BLAKESLEY, of Rock Island, in the county of Rock Island and State of Illinois, have invented certain new and useful Improvements in Domestic Ovens, of which the following is a specification:

Figure 1 is a side view of a cook-stove, showing the present invention applied. Fig. 2 is a plan view of a cook-stove, to show the oven as constructed to receive the rack. Fig. 3 is a perspective view of the rack. Fig. 4 is a side elevation of the rack.

The object of this invention is to provide a rack for cook-stove and other ovens, and so adapt the said ovens to receive the same that said rack can be easily fitted therein, and can be used not only to support the vessels or pans over the oven-floor, but also as a movable shelf to hold the same when being prepared for baking, and when being removed from the oven, or when being kept warm, all as will now be more in detail set out and explained.

In the accompanying drawings, A denotes a cook-stove, having the usual oven B. In this the rack C is adapted to be moved upon the floor, either over rollers $b$, suitably fixed in said floor, or upon the supporting-flanges $c$ of said rack; but, instead of any such devices, the rack may have on its under side rollers for this purpose.

In or upon one or both sides of the oven, and at a convenient point above the floor to allow free movement of the rack between them and the floor, are fixed guides, studs, or hooked nibs D, one or more. These may have rollers, as now shown, or may be merely studs or hooked nibs.

The corners $c'$ of the rack C project upward a little, in order to form stops to act against the guides, studs, or hooked nibs D when the front part of the rack is drawn outward from the oven. The construction of these corners is so regulated relatively to said studs or guides that, by reclining the rack and presenting one side in this way to the said guides, studs, or hooked nibs, the corners or stops $c'$ easily pass under them, and then the rack, being placed upon the floor of the oven, will be securely held in place when being moved merely horizontally.

The rack in its position upon the floor of the oven serves to keep the bottom of the cooking pan, vessel, or plate from the floor, and thus secure the more even action of heat at this point on said vessels or plates.

In placing vessels, pans, or plates in the oven, the rack can be drawn part way out of the oven till its stop $c'$ meets the guides, studs, or hooked nibs D. The said guides will now act to prevent the rack from tilting, and thus the rack will be in convenient position for the reception of said pan, plate, or vessel, and then the rack can be easily pushed into the oven.

When it is desired to remove said articles from the oven, motions the reverse of the above will be as readily accomplished.

The rack may also be drawn out to act as a shelf when it is desired to place vessels or plates upon it, to keep them or the viands in them warm.

It may also be of advantage to have rollers in the side rails or bars of rack C, as shown at $c''$, which can act on the sides of the oven, and render the movements of the rack in and out of the oven more easy of accomplishment.

I am aware that racks have been used in like ovens for the general purpose herein set out, and that such racks have been adapted to and upon a central stop or guide in the front edge of the oven-floor, and that flanges have been used on the oven sides to hold and carry a rack or movable plate; but my invention has three points of difference among others over all previous devices. The rack can, at will, be applied easily or disengaged easily, when so desired, but is so made and adapted that in use it cannot wholly be drawn out of the oven, unless such movement is designed, and it will be equally useful on either side of the stove; nor is any special expense needed to put in studs upon the walls of any oven in order to adapt the rack thereto. In point of economy in construction and facility of application the present invention is considered particularly valuable.

Having thus described my invention, what I consider new, and desire to secure by Letters Patent, is—

1. The rack C, having stop $c'$ at its corners, substantially as and for the purposes set forth.

2. The combination of rack C, having stop $c'$, with oven B, having hooked nibs, guides, or studs D, substantially as and for the purposes set forth.

3. In combination with oven B, having rollers $b$ in its floor, and nibs or studs D, the rack C, substantially as and for the purposes set forth.

4. The rack C, having guide-flanges $c$ on its under side, and side rollers $c''$ and stop $c'$, substantially as described.

In testimony that I claim the foregoing as my own I affix my signature in presence of two witnesses.

ALPHEUS M. BLAKESLEY.

Witnesses:
T. S. ROBINSON,
E. W. HURST.